US007237139B2

(12) United States Patent
Hamilton, II et al.

(10) Patent No.: US 7,237,139 B2
(45) Date of Patent: Jun. 26, 2007

(54) SERVICES HEURISTICS FOR COMPUTER ADAPTER PLACEMENT IN LOGICAL PARTITIONING OPERATIONS

(75) Inventors: Rick Allen Hamilton, II, Charlottesville, VA (US); James Wesley Seaman, Falls Church, VA (US); Johnnye Rumi Lopes Tamaru, Reston, VA (US); Timothy Moffett Waters, Richmond, VA (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 10/636,987

(22) Filed: Aug. 7, 2003

(65) Prior Publication Data

US 2005/0034027 A1 Feb. 10, 2005

(51) Int. Cl.
*G06F 11/00* (2006.01)
(52) U.S. Cl. .................. 714/4; 714/4; 711/173
(58) Field of Classification Search ............ None
See application file for complete search history.

(56) References Cited

U.S. PATENT DOCUMENTS

| 4,603,382 | A | | 7/1986 | Cole et al. ............ 364/200 |
| 5,504,670 | A | | 4/1996 | Barth et al. ........... 364/134 |
| 5,548,735 | A | * | 8/1996 | Chen et al. ............... 710/7 |
| 5,659,717 | A | | 8/1997 | Tse et al. ............... 395/500 |
| 5,875,464 | A | | 2/1999 | Kirk ...................... 711/129 |
| 5,889,989 | A | | 3/1999 | Robertazzi et al. ...... 395/675 |
| 5,978,583 | A | | 11/1999 | Ekanadham et al. ..... 395/703 |
| 6,045,252 | A | | 4/2000 | Pedersen ................ 364/489 |
| 6,154,854 | A | | 11/2000 | Stallmo ...................... 714/6 |
| 6,199,075 | B1 | | 3/2001 | Ungar et al. ............ 707/206 |
| 6,321,373 | B1 | | 11/2001 | Ekanadham et al. ...... 717/1 |
| 6,327,587 | B1 | | 12/2001 | Forster ...................... 707/2 |
| 6,366,945 | B1 | | 4/2002 | Fong et al. ............. 709/104 |
| 6,378,039 | B1 | | 4/2002 | Obara et al. ............ 711/114 |
| 6,421,815 | B1 | | 7/2002 | Seawright ................ 716/7 |
| 6,438,671 | B1 | | 8/2002 | Doing et al. ............ 711/173 |
| 6,684,343 | B1 | * | 1/2004 | Bouchier et al. .......... 714/4 |
| 6,760,859 | B1 | * | 7/2004 | Kim et al. ................. 714/4 |
| 6,944,847 | B2 | * | 9/2005 | Desai et al. ............ 717/121 |
| 6,961,794 | B2 | * | 11/2005 | Atherton et al. ........ 710/301 |
| 2002/0178337 | A1 | | 11/2002 | Wilson et al. .......... 711/173 |
| 2003/0005215 | A1 | | 1/2003 | Arimilli et al. ......... 711/105 |

(Continued)

*Primary Examiner*—Robert Beausoliel
*Assistant Examiner*—Christopher McCarthy
(74) *Attorney, Agent, or Firm*—David A. Mims, Jr.; Rudolf O. Siegesmund; Gordon + Rees, LLP

(57) ABSTRACT

A methodology for configuring the connection of adapters to bus controllers or other possibly failing components (PFCs) in a logically partitioned environment. The present invention comprises an Adapter Placement Program (APP), two Adapter Threshold Programs (ATPs), three Sequential Ranking Programs (SRPs), and three Weighting Factor Programs (WFPs). The APP determines the criteria the administrator desires to use to place the adapters on the bus controllers or other PFCs and selects the appropriate program to execute the adapter placement. The ATPs classify the adapters as either "hot" or "not hot" based on a traffic intensity threshold and place the adapters to the bus controllers or other PFCs. The SRPs rank the adapters and place the adapters to the bus controllers or other PFCs based on their rank. The WFPs assign weighting factors to the adapters and place the adapters to bus controllers or other PFCs based on the adapters' weighting factors.

44 Claims, 11 Drawing Sheets

U.S. PATENT DOCUMENTS

| | | | |
|---|---|---|---|
| 2003/0145117 A1* | 7/2003 | Bhat | 709/249 |
| 2004/0003141 A1* | 1/2004 | Matters et al. | 710/1 |
| 2004/0215915 A1* | 10/2004 | Block et al. | 711/173 |
| 2004/0221039 A1* | 11/2004 | Hamilton et al. | 709/226 |
| 2006/0020943 A1* | 1/2006 | Boutcher et al. | 718/104 |
| 2006/0123204 A1* | 6/2006 | Brown et al. | 711/153 |
| 2006/0224790 A1* | 10/2006 | Arndt et al. | 710/62 |
| 2006/0250945 A1* | 11/2006 | Fernandes et al. | 370/216 |

* cited by examiner

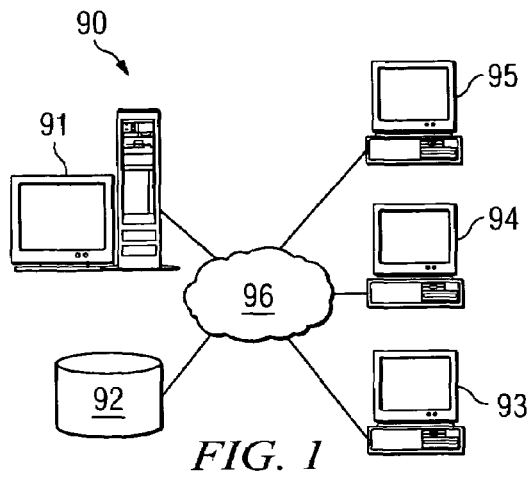
FIG. 1
| MEMORY | ADAPTER DATA | PEP |
|---|---|---|
| 100 | 102 | 104 |
| APP 200 | SRP 500 | WFP 550 |
| ATP 300 | SRP 330 | WFP 360 |
| ATP 400 | SRP 430 | WFP 460 |
FIG. 2
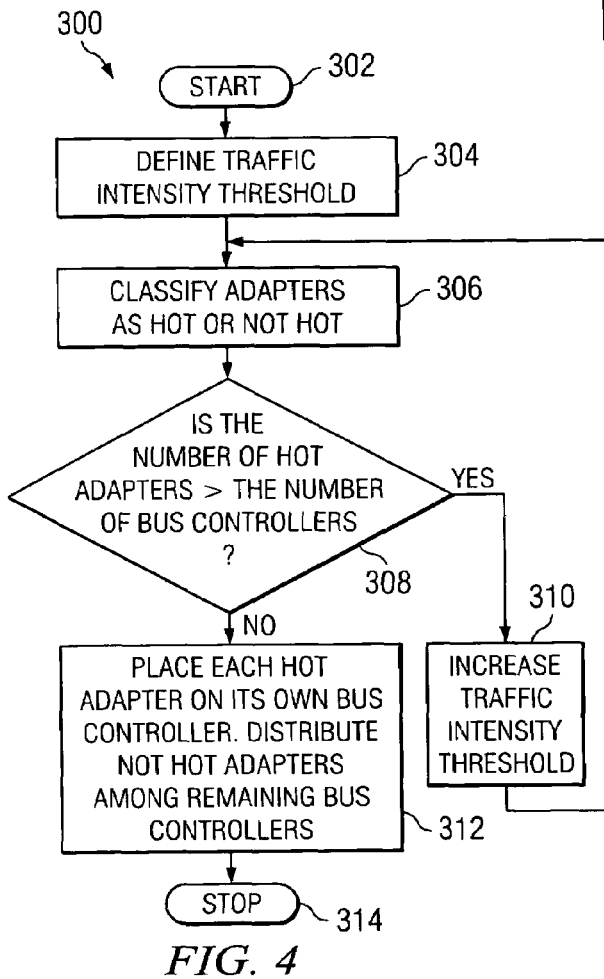
FIG. 4

SERVICES HEURISTICS FOR COMPUTER ADAPTER PLACEMENT IN LOGICAL PARTITIONING OPERATIONS

FIELD OF THE INVENTION

The present invention is related generally to method for increasing computer system efficiency, and specifically to a computer program for allocating and/or reallocating adapters amongst virtual systems.

BACKGROUND OF THE INVENTION

A computer system is a collection of computer components, such as adapters, which work together to perform a specific task, and is well known in the art. The computer systems may be located in a single computer, such as a server, or in a plurality of computers, such as computer network. System administrators (hereinafter, administrators) are people who setup and manage computer systems. One of the tools used by administrators to increase the performance of a computer system is physical partitioning. Administrators physically partition a managed system by dedicating buses and predefined physical modules within the system to assist in creating the smaller partitioned systems, referred to as virtual systems. Each virtual system in a managed system appears to the end user as a completely separate system. In addition, virtual systems improve administrative flexibility and application performance.

Another method used by administrators to increase system performance is logical partitioning. Logical partitioning is a process which creates logical partitions within the managed system. Logical partitioning is distinct from physical partitioning in that there are no physically separated buses, memory, or adapters in a logically partitioned system. Instead, the virtual systems are separated only by the system software. Similar to the physically partitioned system, each individual virtual system created by logical partitioning appears to the end user as a completely separate system. One advantage of logical partitioning is that logical partitioning permits much finer granularity in virtual system creation, such that any processor, memory, or adapter may be easily added to or removed from a virtual system. Logical partitioning is generally controlled by a hardware management console outside of the managed system. The hardware management console controls the division of the managed system into the virtual systems and, if necessary, the reallocation of resources amongst the various virtual systems.

Recently, administrators have been able to move system hardware resources within the managed system with increased flexibility. When the reallocation occurs without having to reboot the managed system, the logical partitioning is known as dynamic logical partitioning. The prior art methods of dynamic reallocation require the system administrator to recognize the need for reallocation, and then manually reallocate the resources. For example, in a system comprising a first logical partition having two fibre channel storage adapters and a second logical partition having two fibre channel storage adapters, the system administrator may observe that during a peak processing period, the first logical partition is experiencing a heavy wait time and the second logical partition is not. Upon observing the disparity in wait time, the administrator may manually move one or more adapters from the second logical partition to the first logical partition to improve system performance during the peak processing period. Therefore, a need exists for a system and method to automate the control and movement of resources in a dynamic logical partitioning environment.

Furthermore, when designing the initial layout of virtual systems, it is preferable if the adapters within a virtual system are not dependent on a single bus controller or other possibly failing component (PFC). The need for redundancy within adapter connections to bus controllers and other PFCs extends to the situation where adapters are reallocated amongst virtual systems as well. The prior art methods of initial adapter placement and connection to bus controllers and other PFCs involve a great deal of artisan knowledge of the hardware architecture and implementation in order to achieve optimal adapter configuration. However, the prior art methods do not always minimize the risk of loss of a bus controller or other PFC amongst the maximum number of adapters, and vice-versa. Therefore, a need exists for a method and apparatus for an automated method of optimizing initial adapter placement and connection to bus controllers and other PFCs such that the managed system experiences a minimal loss of adapters when a bus controller or other PFC fails.

The need for automation within the initial adapter configuration and subsequent reallocation process has been addressed by the prior art. U.S. Pat. No. 4,603,382 (the '382 patent) entitled "Dynamic Buffer Reallocation" discloses a method for dynamically reallocating data storage segments within a storage device. The '382 patent monitors the properties of the data storage device and reallocates the buffer segments when they exceed a predefined threshold. U.S. Pat. No. 5,875,464 (the '464 patent) entitled "Computer System with Private and Shared Partitions in Cache" discloses a partitioned cache memory buffer which monitors the allocation of tasks. The memory buffer of the '464 patent reallocates the tasks when necessary. U.S. Pat. No. 5,978,583 (the '583 patent) discloses a method of reallocating applications during the course of their execution. The method disclosed in the '583 patent monitors the applications and redistributes the applications when necessary based on various criteria. U.S. Pat. No. 6,366,945 (the '945 patent) entitled "Flexible Dynamic Partitioning of Resources in a Cluster Computing Environment" discloses a method for dynamic partitioning of a computer network. The method of the '945 patent monitors the resources within the virtual networks and moves resources among networks when required. However, the '945 patent is limited in that it does not disclose a method for initial adapter configuration or subsequent dynamic logical partitioning of a managed network. Consequently, what is needed beyond the '382, '464, '583, and '945 patents is a method and system for initial adapter configuration of a managed system. Furthermore, a need exists for a method and system for the subsequent reallocation of resources among the computers within a virtual system.

SUMMARY OF THE INVENTION

The present invention, which meets the needs stated above, is a methodology for configuring the connection of adapters to bus controllers and other possibly failing components (PFCs) in a logically partitioned environment. The configuration of adapters onto bus controllers or other PFCs can be either for the initial configuration of a managed system or for the subsequent reallocation of adapters amongst the logical partitions in the managed system. The software embodiment of the present invention comprises an Adapter Placement Program (APP), two Adapter Threshold Programs (ATPs), three Sequential Ranking Programs (SRPs), and three Weighting Factor Programs (WFPs). The APP determines the criteria the administrator desires to use to place the adapters on the bus controllers or other PFCs and selects the appropriate program to execute the adapter placement. The ATPs classify the adapters as either "hot" or "not hot" based on a traffic intensity threshold. The ATPs also place the adapters to the bus controllers or other PFCs. The SRPs rank the adapters based on their traffic intensity. The SRPs also place the adapters to the bus controllers or other PFCs based on their rank. The WFPs assign weighting factors to the adapters based on their traffic intensity. The WFPs also place the adapters to bus controllers or other PFCs based on the adapters' weighting factors.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an illustration of a computer network used to implement the present invention;

FIG. 2 is an illustration of the memory used to implement the present invention;

FIG. 4 is an illustration of the logic of First Adapter Threshold Program (ATP1) of the present invention;

DETAILED DESCRIPTION OF THE PREFERRED EMBODIMENT

Figure 3:
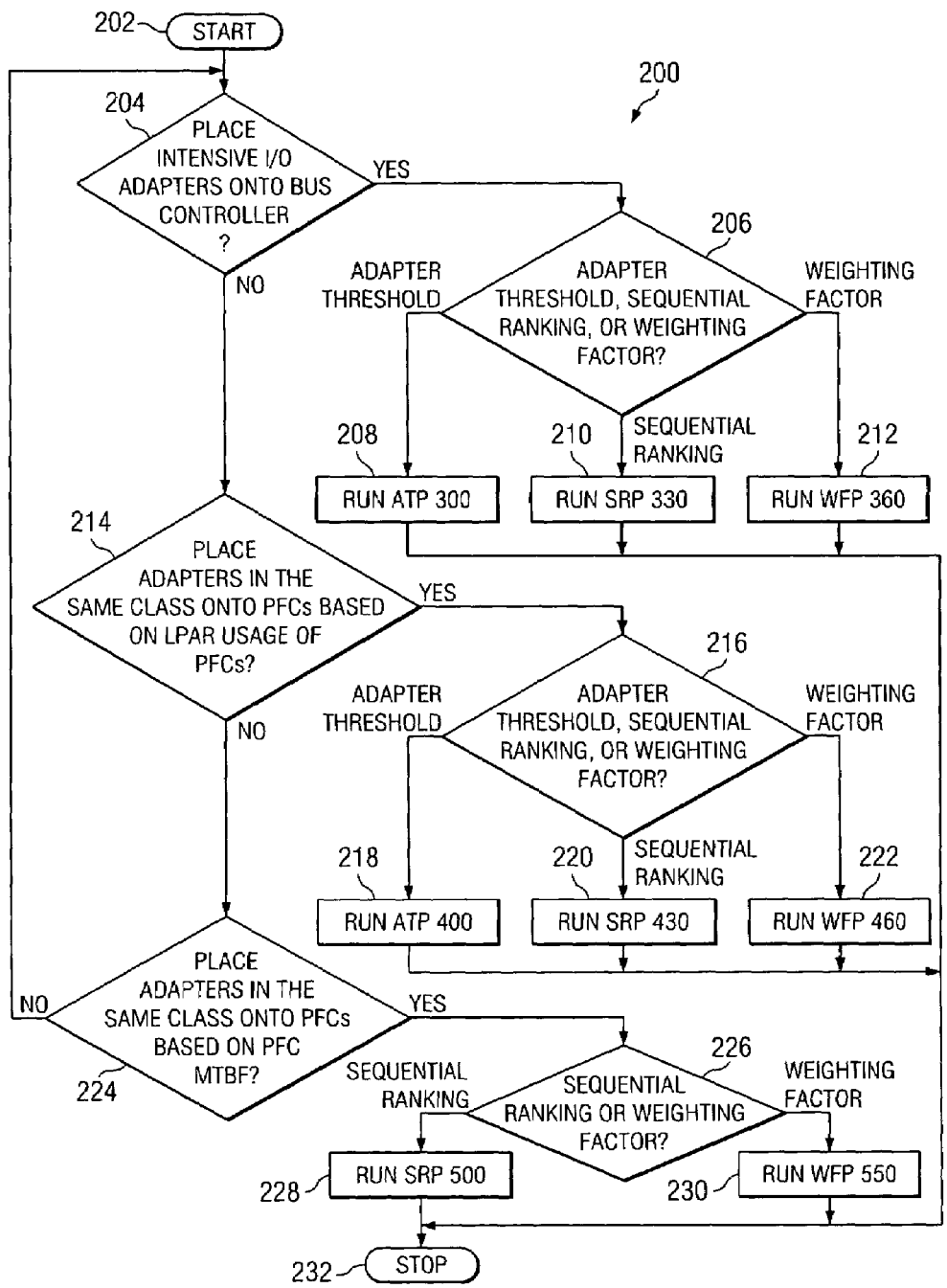
FIG. 3 is an illustration of the logic of the Adapter Placement Program (APP) of the present invention.

As used herein, the term "adapter" means the input/output adapters of a virtual system. Examples of adapters include gigabit ethernet, 10/100 ethernet, fibre channel, Asynchronous Transfer Mode (ATM), and Fiber Distributed Data Interface (FDDI).

As used herein, the term "adapter failure" means the inability of an adapter to perform its intended task. Adapter failure can be implicitly reflected in the performance parameter: if a fibre channel adapter fails, then the I/O wait time increases on the failed adapter, any associated adapters, and/or any load-balanced adapters in the system. Adapter failure may also be explicitly reflected in the performance parameter: when the fibre channel is working, no action is necessary, but when the fibre channel is not working, action is necessary.

As used herein, the term "adapter class" means a group of adapters which perform the same function or task. Examples of adapter classes are ethernet adapters and storage adapters. Persons of ordinary skill in the art are aware of other adapter classes.

As used herein, the term "adapter subclass" means a specific type of adapter within an adapter class. Examples of adapter subclasses include: gigabit ethernet, 10/100 ethernet, fibre channel, Asynchronous Transfer Mode (ATM), and Fiber Distributed Data Interface (FDDI). Persons of ordinary skill in the art are aware of other adapter subclasses.

As used herein the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "controlling entity" means the computational device, either internal or external to the managed system, which manages the initial allocation or reallocation of adapters. In a UNIX environment, the controlling entity is known as the Hardware Management Console.

As used herein, the term "enstat" means a UNIX utility used to monitor I/O on, specifically, class 802 ethernet network adapters or subsystems. Persons skilled in the art are aware of other specific monitors, similar to enstat, which exist for the wide range of I/O adapters available in computer systems.

As used herein, the term "I/O wait" means the condition within a system where a given input/output device is completely saturated with workload, and as such, any new I/O requests are place in a cached/memory wait queue until such time that the I/O subsystem is able to complete processing of current requests and respond to the new requests.

As used herein, the term "managed system" means a collection of hardware components, such as adapters, which work together to accomplish a specific task. The hardware components may be located in a single computer or in a plurality of networked computers.

As used herein, the term "MTBF" is an acronym for "mean time between failure" and means the average time interval, usually expressed in thousands or tens of thousands of hours that will elapse before a possibly failing component fails and requires service. The average time may be computed using the median, mean, mode, or norm.

As used herein, the term "netstat" means a UNIX utility used to monitor I/O on network adapters or subsystems.

As used herein, the term "performance parameter" means one or more parameters used to measure the workload on an adapter. Performance parameters include I/O wait, netstat, entstat, and adapter failure. Other performance parameters are known by persons skilled in the art. Performance parameters may also include a combination of several individual performance parameters. Specific performance parameters may also be specified for an adapter class or subclass.

As used herein, the term "place" or "placing" means the action of electrically connecting or otherwise associating an adapter within a virtual system with a bus controller or other PFC in a logically partitioned environment.

As used herein, the term "PFC" is an acronym for "possibly failing component" and means any physical component which may potentially fail and remove its associated adapters from service. Examples of PFCs are bus controllers, physical drawers, and physical cabinets. Persons of ordinary skill in the art are aware of other PFCs.

As used herein, the term "traffic" means the tasks or activities an adapter is intended to perform.

As used herein, the term "traffic intensity" means a quantitative measure of the amount of traffic on an adapter.

As used herein, the term "virtual system" means a collection of resources within a managed system which is separated from other virtual systems by logical partitioning.

FIG. 1 is an illustration of computer network 90 associated with the present invention. Computer network 90 comprises local machine 95 electrically coupled to network 96. Local machine 95 is electrically coupled to remote machine 94 and remote machine 93 via network 96. Local machine 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network that may contain the present invention and is not meant as an architectural limitation.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Adapter Placement Program (APP) 200. APP 200 includes First Adapter Threshold Program (ATP1) 300, First Sequential Ranking Program (SRP1) 330, First Weighting Factor Program (WFP1) 360, Second Adapter Threshold Program (ATP2) 400, Second Sequential Ranking Program (SRP2) 430, Second Weighting Factor Program (WFP2) 460, Third Sequential Ranking Program (SRP3) 500, and Third Weighting Factor Program (WFP3) 550. APP 200, ATP1 300, SRP1 330, WFP1 360, ATP2 400, SRP2 430, WFP2 460, SRP3 500, and WFP3 550 described herein can be stored within the memory of any computer depicted in FIG. 1. Alternatively, APP 200, ATP1 300, SRP1 330, WFP1 360, ATP2 400, SRP2 430, WFP2 460, SRP3 500, and WFP3 550 can be stored in an external storage device such as a removable disk or a CD-ROM. Memory 100 is illustrative of the memory within one of the computers of FIG. 1. Memory 100 also contains adapter data 102 and Performance Enhancement Program (PEP) 104. PEP 104 is a program that determines when adapters need to be allocated or reallocated and may be similar to the PEP disclosed in US Patent Application (Attorney Docket No. AUS920030193US1), incorporated herein by reference. Alternatively, persons skilled in the art can practice the present invention without PEP 104 when initially designing virtual systems within a managed system. The present invention may interface with adapter data 102 and PEP 104 through memory 100. As part of the present invention, the memory 100 can be configured with APP 200, ATP1 300, SRP1 330, WFP1 360, ATP2 400, SRP2 430, WFP2 460, SRP3 500, and/or WFP3 550.

In alternative embodiments, APP 200, ATP1 300, SRP1 330, WFP1 360, ATP2 400, SRP2 430, WFP2 460, SRP3 500, and/or WFP3 550 can be stored in the memory of other computers. Storing APP 200, ATP1 300, SRP1 330, WFP1 360, ATP2 400, SRP2 430, WFP2 460, SRP3 500, and/or WFP3 550 in the memory of other computers allows the processor workload to be distributed across a plurality of processors instead of a single processor. Further configurations of APP 200, ATP1 300, SRP1 330, WFP1 360, ATP2 400, SRP2 430, WFP2 460, SRP3 500, and/or WFP3 550 across various memories are known by persons skilled in the art.

Turning to FIG. 3, a flowchart of the logic of APP 200 is illustrated. APP 200 is a program which determines which adapter allocation program to run. APP 200 may determine which adapter allocation program to run for a particular adapter class or adapter subclass. APP starts (202) and determines if the user wants to place intensive I/O adapters onto at least one bus controller (204). If the user wants to place the intensive I/O adapters onto the bus controllers, then APP 200 makes a determination whether the user wants to place the adapters using an adapter threshold, sequential ranking, or weighting factors (206). If the user wants to place the adapters on the bus controllers using an adapter threshold, then APP 200 runs ATP1 300 (208) and ends (232). If the user wants to place the adapters on the bus controllers using sequential ranking, then APP 200 runs SRP1 330 (210) and ends (232). If the user wants to place the adapters on the bus controllers using weighting factors, then APP 200 runs WFP1 360 (212) and ends (232).

If at step 204 the user does not want to place intensive I/O adapters onto bus controllers, then APP 200 makes a determination whether the user wants to place adapters in the same class onto possibly failing components (PFCs) based on the other virtual systems' usage of the PFCs (214). If the user wants to place adapters on the PFCs based on other virtual systems' usage of the PFCs, then APP 200 makes a determination whether the user wants to place the adapters using an adapter threshold, sequential ranking, or weighting factors (216). If the user wants to place the adapters on the PFCs using an adapter threshold, then APP 200 runs ATP2 400 (218) and ends (232). If the user wants to place the adapters on the PFCs using sequential ranking, then APP 200 runs SRP2 430 (220) and ends (232). If the user wants to place the adapters on the PFCs using weighting factors, then APP 200 runs WFP2 460 (222) and ends (232).

If at step 214 the user does not want to place adapters based on other virtual systems' usage of the PFCs, APP 200 makes a determination whether the user wants to place adapters onto PFCs based on the PFC mean time between failure (MTBF) (224). If the user does not want to place adapters based on the PFC MTBF, then APP returns to step 204. If the user wants to place adapters on the PFCs based on the PFC MTBF, then APP 200 makes a determination whether the user wants to place the adapters using sequential ranking or weighting factors (226). If the user wants to place the adapters on the PFCs using sequential ranking, then APP 200 runs SRP2 430 (228) and ends (232). If the user wants to place the adapters on the PFCs using weighting factors, then APP 200 runs WFP2 460 (230) and ends (232).

Turning to FIG. 4, the logic of ATP1 300 is illustrated. ATP1 300 is a program which places adapters with a specific level of I/O traffic onto their own bus controllers. ATP1 300 starts (302) when prompted by APP 200. ATP1 300 then accepts a user definition of a traffic intensity threshold (304). For example, a user may define the intensity threshold as two items in an adapters I/O wait queue. ATP1 300 then compares the adapters to the traffic intensity threshold and classifies the adapters as "hot" or "not hot" (306). The adapters will be "hot" if they meet or exceed the traffic intensity threshold. The adapters will be "not hot" if they do not meet or exceed the traffic intensity threshold. ATP1 300 then makes a determination whether the number of "hot" adapters is greater than the number of bus controllers (308). If the number of "hot" adapters is greater than or equal to the number of bus controllers, then ATP1 300 increases the traffic intensity threshold (310) and returns to step 306. Alternatively, ATP1 300 can instruct the user to increase the traffic intensity threshold manually. ATP1 300 can increase the traffic intensity threshold incrementally or any amount determined by persons of ordinary skill in the art. If at step 308, ATP1 300 determines that the number of "hot" adapters is not greater than the number of bus controllers, then ATP1 300 places each "hot" adapter onto a single bus controller (312). At step 312, ATP1 300 also distributes the "not hot" adapters among the remaining bus controllers. ATP1 300 then ends (314).

Figure 5:
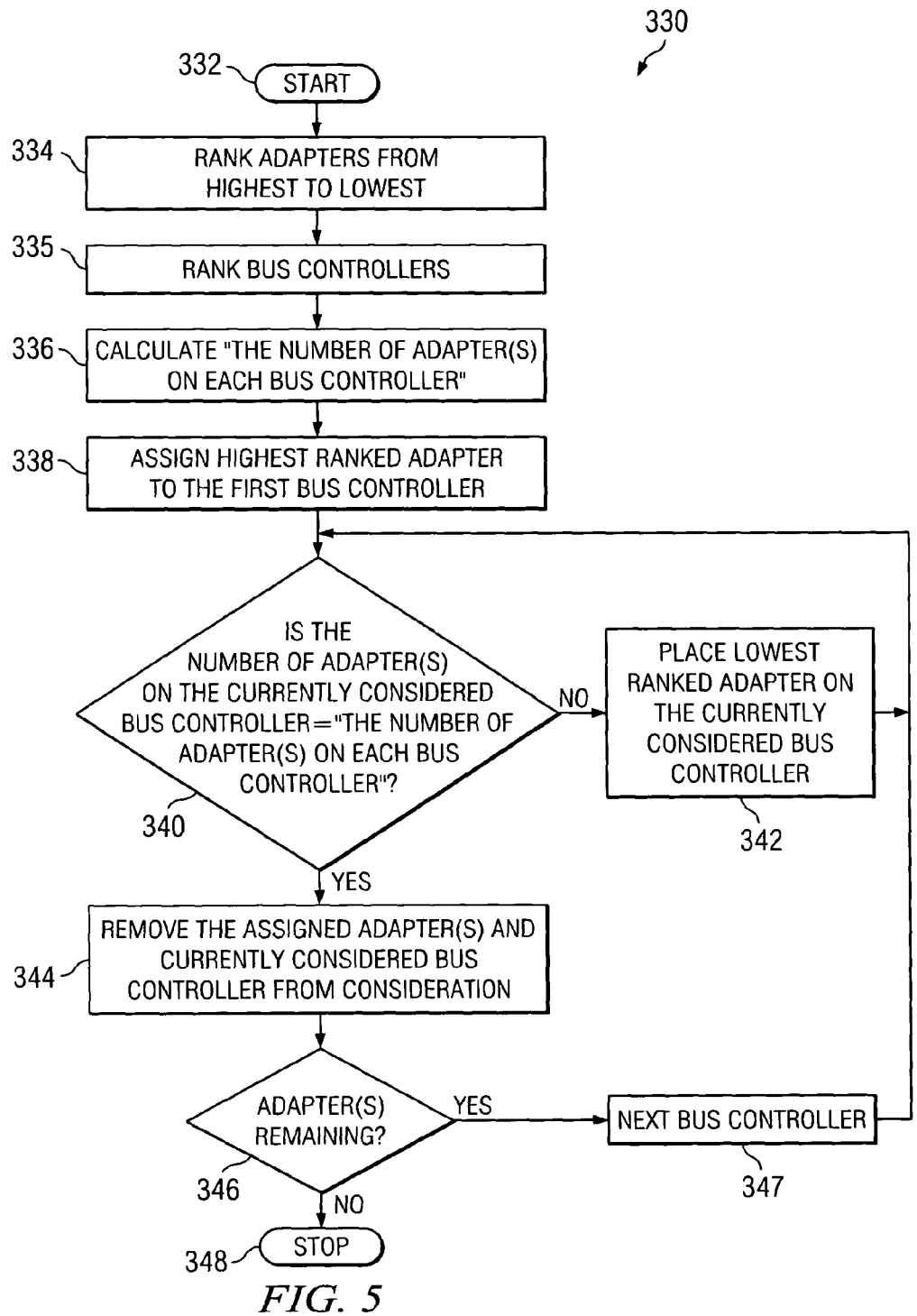
FIG. 5 is an illustration of the logic of First Sequential Ranking Program (SRP1) of the present invention.

Turning to FIG. 5, the logic of SRP1 330 is illustrated. SRP1 330 is a program which ranks the adapters and places the adapters onto the bus controllers based on the adapters' rank. SRP1 330 starts (332) when prompted by APP 200. SRP1 330 then ranks the adapters from highest to lowest based on the adapters' traffic intensity (334). In ranking the adapters, the adapter with the highest traffic intensity is ranked first and the adapter with the lowest traffic intensity is ranked last. For example, if adapter A has a traffic intensity of 2, adapter B has a traffic intensity of 4, and adapter C has a traffic intensity of 5, then the adapters will be ranked (1)C, (2)B, and (3)A. SRP1 330 then ranks the bus controllers based on the priority of the bus controllers (335). If all of the bus controllers are equivalent, then the ranking step described herein is arbitrary and merely creates an order in which the bus controllers will be considered. If the bus controllers are not equivalent as is the case when there are bus controllers inside (internal) and outside (external) of the managed system housing, the ranking step ranks the more preferable bus controllers first and the least preferable bus controllers are ranked last. SRP1 330 then calculates "the number of adapter(s) on each bus controller" (336). "The number of adapter(s) on each bus controller" is equal to the number of adapters divided by the number of bus controllers $$\left( \frac{\text{\# adapters}}{\text{\# bus controllers}} \right)$$

rounded down to the nearest whole number. Rounding down insures that the more prioritized adapters will be placed on the less crowded bus controllers when there are an uneven amount of adapters on each bus controller. SRP1 330 then assigns the highest ranked adapter to the first bus controller (338). SRP1 330 then makes a determination whether the number of adapter(s) on the currently considered bus controller is equal to "the number of adapter(s) on each bus controller" calculated in step 336 (340). If the number of adapter(s) on the first bus controller is not equal to "the number of adapter(s) on each bus controller," then SRP1 330 places the lowest ranked adapter on the currently considered bus controller (342) and returns to step 340. If at step 340 the number of adapter(s) on the first bus controller is equal to "the number of adapter(s) on each bus controller," then SRP1 330 removes the assigned adapter(s) and currently considered bus controller from consideration (344). SRP1 330 then determines if there are adapter(s) remaining (346). If there are adapter(s) remaining, then SRP1 330 proceeds to the next bus controller (347) and returns to step 340. If there are not any adapter(s) remaining, then SRP1 330 ends (348).

Figure 6:
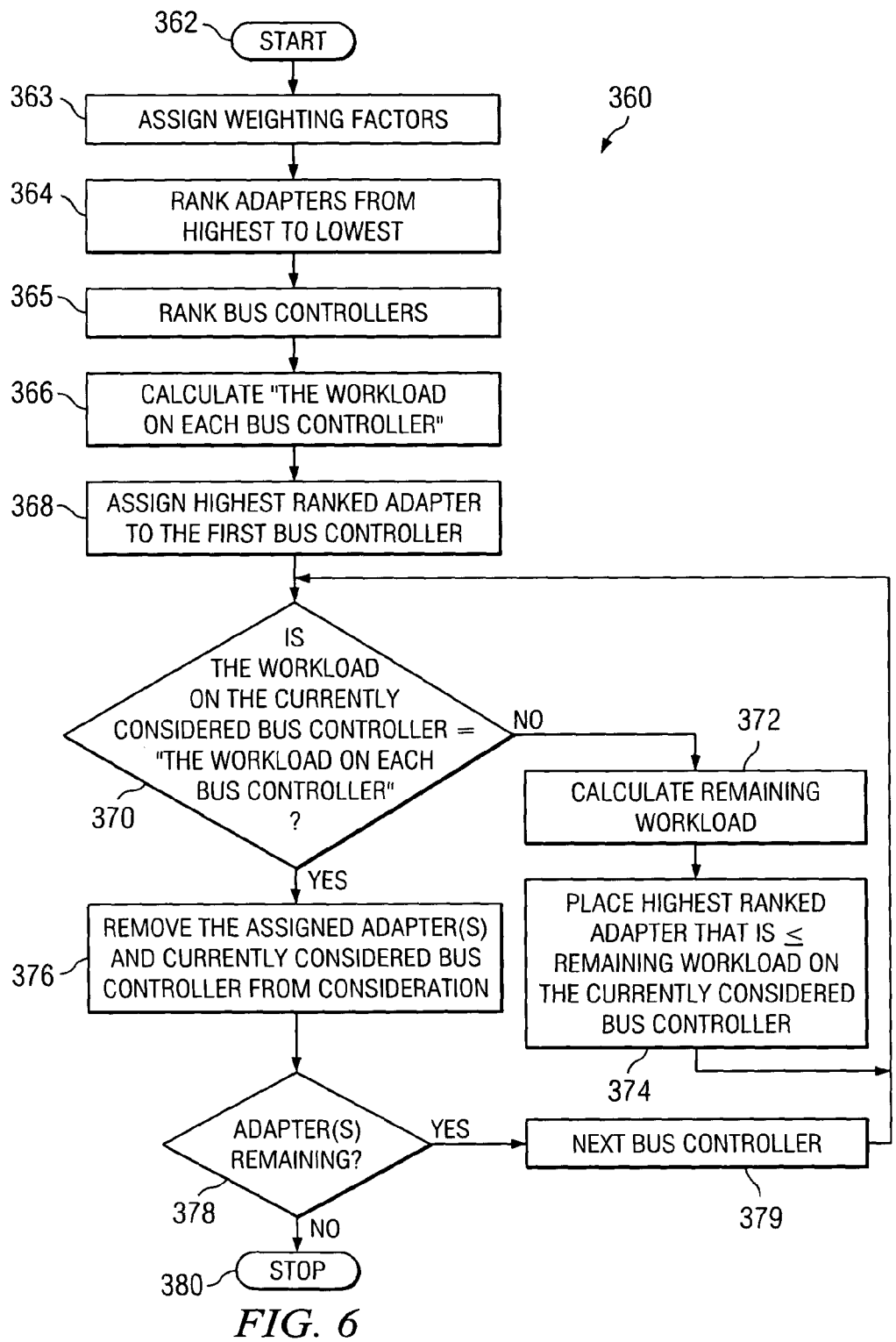
FIG. 6 is an illustration of the logic of First Weighting Factor Program (WFP1) of the present invention.

Turning to FIG. 6, the logic of WFP1 360 is illustrated. WFP1 360 is a program which assigns weighting factors to the adapters and places the adapters onto the bus controllers based on the adapters' weighting factor. WFP1 360 starts (362) when prompted by APP 200. WFP1 360 assigns weighting factors to the adapters based on one of the adapters' traffic intensity (363). For example, if adapter A has a traffic intensity of 2, adapter B has a traffic intensity of 4, and adapter C has a traffic intensity of 5, then the adapters are given weighting factors of 2, 4, and 5, respectively. WFP1 360 then ranks the adapters from highest to lowest based on the adapters' weighting factor (364). For example, if adapter A has a weighting factor of 2, adapter B has a weighting factor of 4, and adapter C has a weighting factor of 5, then the adapters will be ranked (1)C, (2)B, (3)A. WFP1 360 then ranks the bus controllers based on the priority of the bus controllers (365). If all of the bus controllers are equivalent, then the ranking step described herein is arbitrary and merely creates an order in which the bus controllers will be considered. If the bus controllers are not equivalent as is the case when there are bus controllers inside (internal) and outside (external) of the managed system housing, the ranking step ranks the more preferable bus controllers first and the least preferable bus controllers last. WFP1 360 then calculates "the workload on each bus controller" (366). "The workload on each bus controller" is equal to the sum of the weighting factors divided by the total number of bus controllers $$\left( \frac{\sum \text{weighting factors}}{\text{\# bus controllers}} \right)$$

rounded down to the nearest whole number. Rounding down insures that the more prioritized adapters will be placed on the less crowded bus controllers when there are an uneven amount of adapters on each bus controller. WFP1 360 then assigns the highest ranked adapter to the first bus controller (368). WFP1 360 then makes a determination whether the workload on the currently considered bus controller is equal to "the workload on each bus controller" calculated in step 366 (370). If the workload on the currently considered bus controller is not equal to "the workload on each bus controller," then WFP1 360 calculates the remaining workload (372). The remaining workload is equal to "the workload on each bus controller" calculated in step 366 minus the workload of the adapter(s) already assigned to the currently considered bus controller. WFP1 360 then places the highest ranked adapter that is less than or equal to the remaining workload on the currently considered bus controller (374) and returns to step 370. If at step 370 the workload on the currently considered bus controller is equal to "the workload on each bus controller," then WFP1 360 removes the assigned adapter(s) and the currently considered bus controller from consideration (376). WFP1 360 then determines if there are adapter(s) remaining (378). If there are adapter(s) remaining, then WFP1 360 proceeds to the next bus controller (379) and returns to step 370. If there are not any adapter(s) remaining, then WFP1 360 ends (380).

Figure 7:
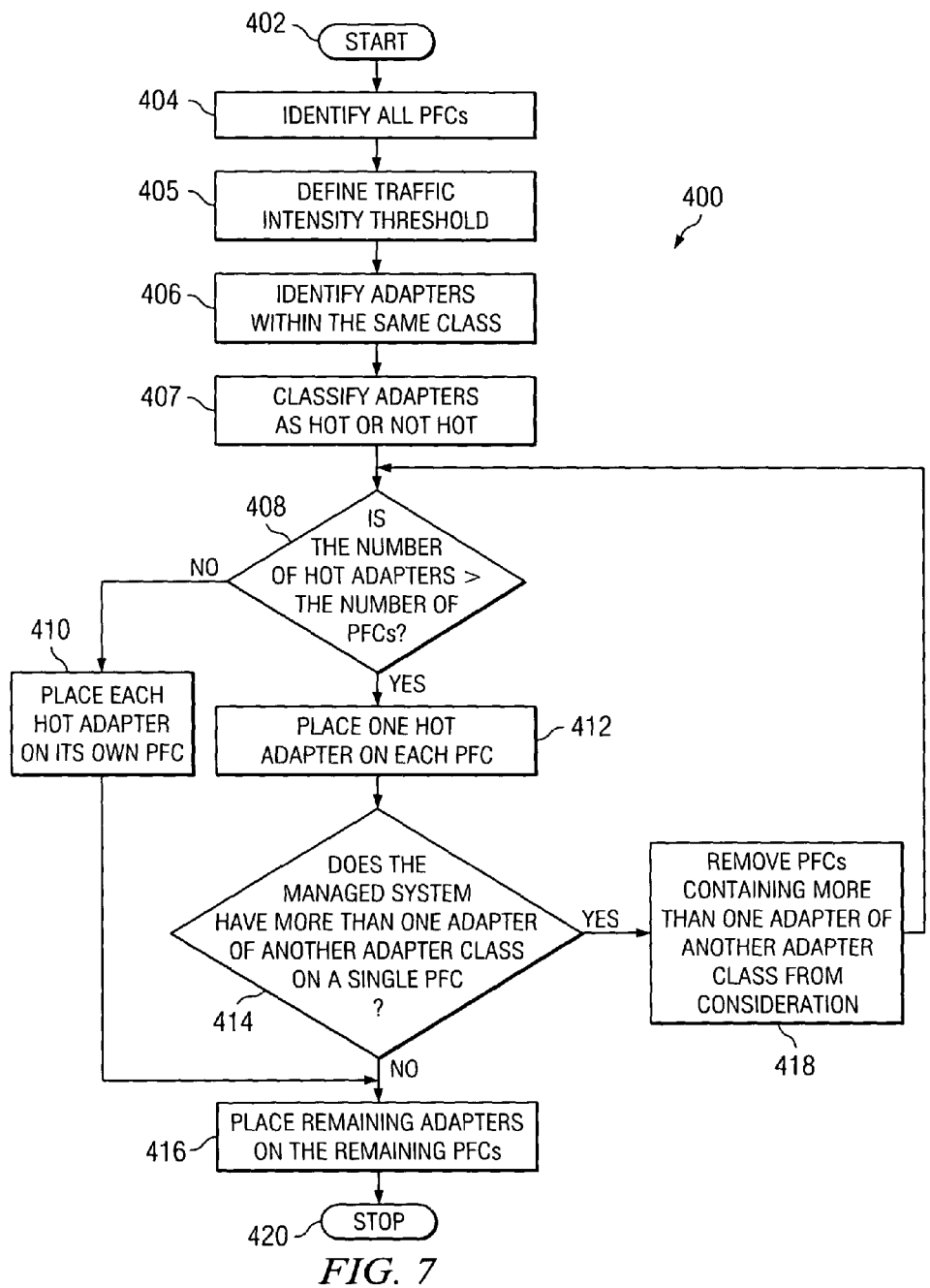
FIG. 7 is an illustration of the logic Second Adapter Threshold Program (ATP2) of the present invention.

Turning to FIG. 7, the logic of ATP2 400 is illustrated. ATP2 400 is a program which places adapters with a specific level of I/O traffic onto their own PFC. ATP2 400 starts (402) when prompted by APP 200. ATP2 400 then identifies all PFCs (404). ATP2 400 then accepts a user definition of a traffic intensity threshold (405). ATP2 400 then identifies all of the adapters within the same class (406). ATP2 400 then compares the adapters to the traffic intensity threshold and classifies the adapters as "hot" or "not hot" (407). The adapters will be "hot" if they meet or exceed the traffic intensity threshold. The adapters will be "not hot" if they do not meet or exceed the traffic intensity threshold. ATP2 400 then makes a determination whether the number of "hot" adapters is greater than the number of PFCs (408). If the number of "hot" adapters is not greater than the number of PFCs, then ATP2 400 places each hot adapter on its own PFC (410) and goes to step 416. If at step 408 the number of "hot" adapters is greater than the number of PFCs, then ATP2 400 places one "hot" adapter on each PFC (412). ATP2 400 then makes a determination whether the managed system has more than one adapter of another adapter class on any of the PFCs (414). If any of the PFCs contain more than one adapter of another class, then those adapters are removed from consideration (418) and ATP2 400 returns to step 408. If at step 414 ATP2 400 determines that there are no PFCs containing more than one adapter of another adapter class, then ATP2 400 places the remaining adapters on the remaining PFCs (416) and ends (420).

Figure 8:
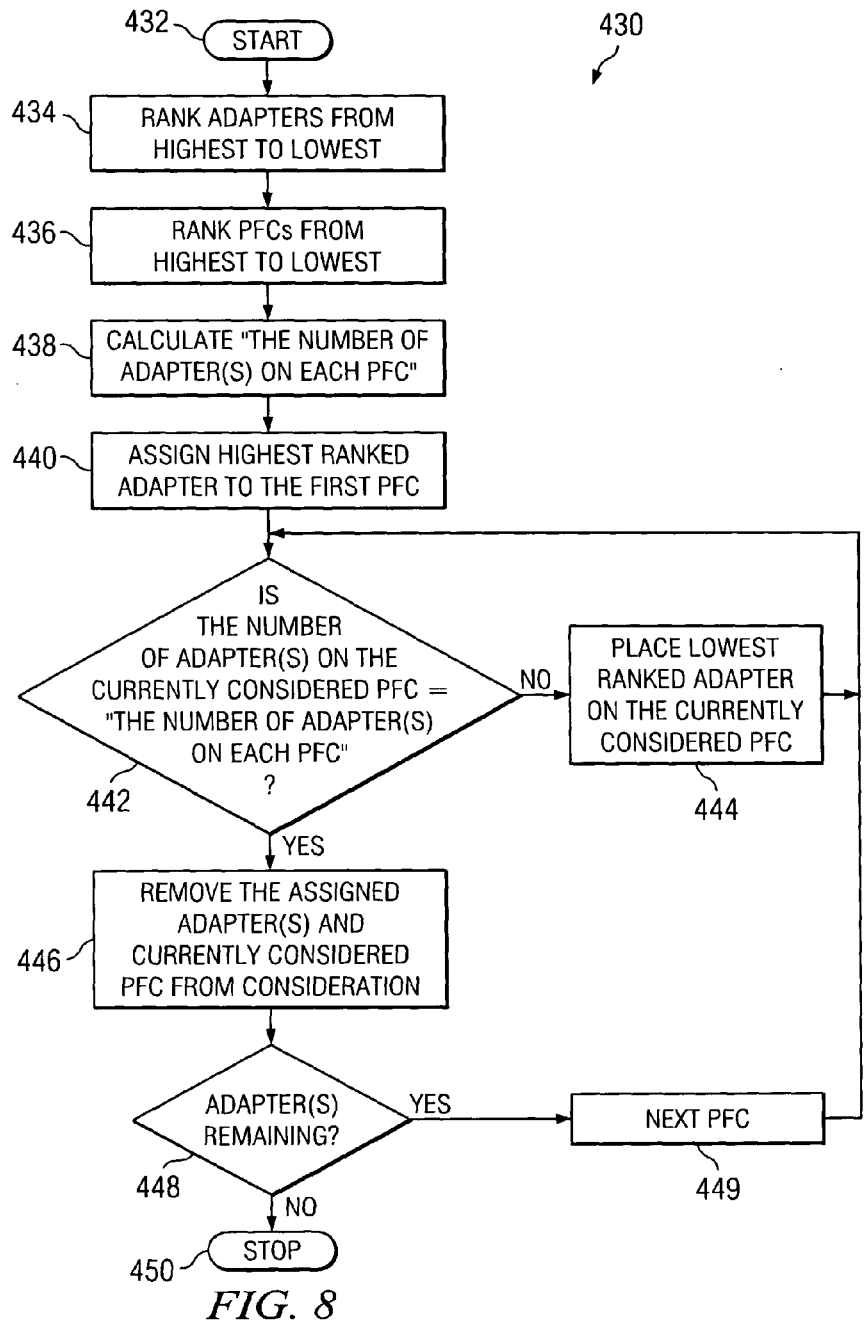
FIG. 8 is an illustration of the logic of Second Sequential Ranking Program (SRP2) of the present invention.

Turning to FIG. 8, the logic of SRP2 430 is illustrated. SRP2 430 is a program which ranks the adapters and places the adapters onto the PFCs based on the adapters' rank. SRP2 430 starts (432) when prompted by APP 200. SRP2 430 then ranks the adapters from highest to lowest based on the adapters' traffic intensity (434). SRP2 430 then ranks the PFCs from highest to lowest based on the amount of adapters already on the PFCs (436). In ranking the PFCs, the PFC containing the fewest adapters is ranked first and the PFC containing the most adapters is ranked last. For example, if PFC A already contains two adapters, PFC B already contains four adapters, and PFC C already contains five adapters, the PFCs will be ranked (1)A, (2)B, and (3)C. SRP2 430 then calculates "the number of adapter(s) on each PFC" (438). "The number of adapter(s) on each PFC" is equal to the number of adapter(s) divided by the number of PFCs $$\left(\frac{\text{\# adapters}}{\text{\# PFCs}}\right)$$

rounded down to the nearest whole number. Rounding down insures that the more prioritized adapters will be placed on the less crowded PFCs when there are an uneven amount of adapters on each PFC. SRP2 430 then assigns the highest ranked adapter to the first PFC (440). SRP2 430 then makes a determination whether the number of adapter(s) on the currently considered PFC is equal to "the number of adapter(s) on each PFC" calculated in step 438 (442). If the number of adapter(s) on the currently considered PFC is not equal to "the number of adapter(s) on each PFC," then SRP2 430 places the lowest ranked adapter on the currently considered PFC (444) and returns to step 442. If at step 442 the number of adapter(s) on the currently considered PFC is equal to "the number of adapter(s) on each PFC" from step 438, then SRP2 430 removes the assigned adapter(s) and currently considered PFC from consideration (446). SRP2 430 then determines if there are adapter(s) remaining (448). If there are adapter(s) remaining, then SRP2 430 proceeds to the next PFC (449) and returns to step 442. If there are not any adapter(s) remaining, then SRP2 430 ends (450).

Figure 9:
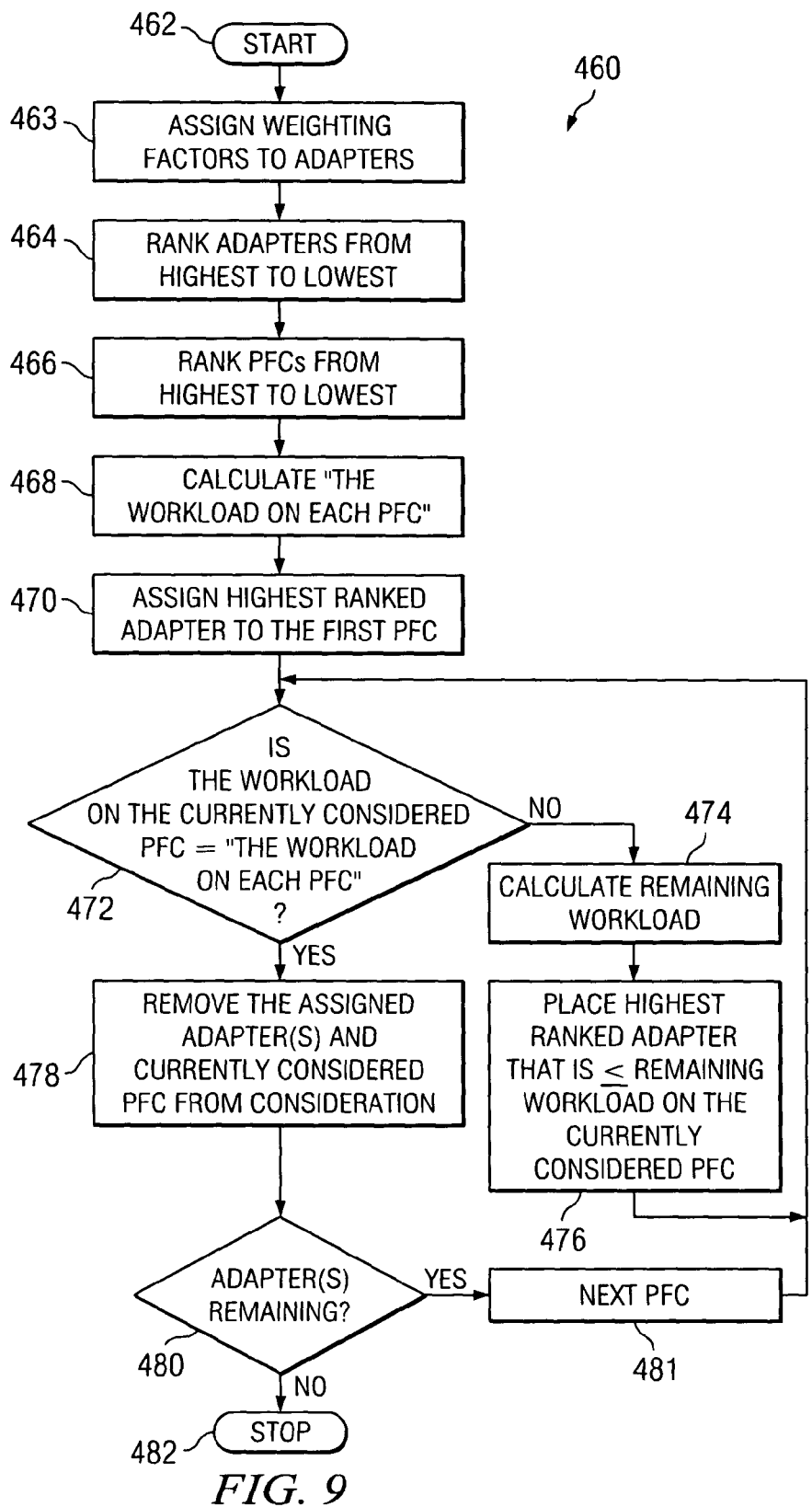
FIG. 9 is an illustration of the logic of Second Weighting Factor Program (WFP2) of the present invention.

Turning to FIG. 9, the logic of WFP2 460 is illustrated. WFP2 460 is a program which places weighting factors to the adapters and places the adapters onto the PFCs based on the adapters' weighting factor. WFP2 460 starts (462) when prompted by APP 200. WFP2 460 assigns weighting factors to the adapters based on one of the adapters' traffic intensity (463). WFP2 460 then ranks the adapters from highest to lowest based on the adapters' weighting factor (464). WFP2 460 then ranks the PFCs from highest to lowest based on the amount of adapters already on the PFCs (466). WFP2 460 then calculates "the workload on each PFC" (468). "The workload on each PFC" is equal to the sum of the weighting factors divided by the total number of PFCs $$\left(\frac{\sum \text{weighting factors}}{\text{\# PFCs}}\right)$$

rounded down to the nearest whole number. Rounding down insures that the more prioritized adapters will be placed on the less crowded PFCs when there are an uneven amount of adapters on each PFC. WFP2 460 then places the highest ranked adapter on the first PFC (470). WFP2 460 then makes a determination whether the workload on the currently considered PFC is equal to "the workload on each PFC" calculated in step 468 (472). If the workload on the currently considered PFC is not equal to "the workload on each PFC," then WFP2 460 calculates the remaining workload (474). The remaining workload is equal to "the workload on each PFC" calculated in step 468 minus the workload of the adapter(s) already assigned to the currently considered PFC. WFP2 460 then places the highest ranked adapter that is less than or equal on the remaining workload on the currently considered PFC (476) and returns to step 472. If at step 472 the workload on the currently considered PFC is equal to "the workload on each PFC," then WFP2 460 removes the assigned adapter(s) and currently considered PFC from consideration (478). WFP2 460 then determines if there are adapter(s) remaining (480). If there are adapter(s) remaining, then WFP2 460 proceeds to the next PFC (481) and returns to step 472. If there are not any adapter(s) remaining, then WFP2 460 ends (482).

Figure 10:
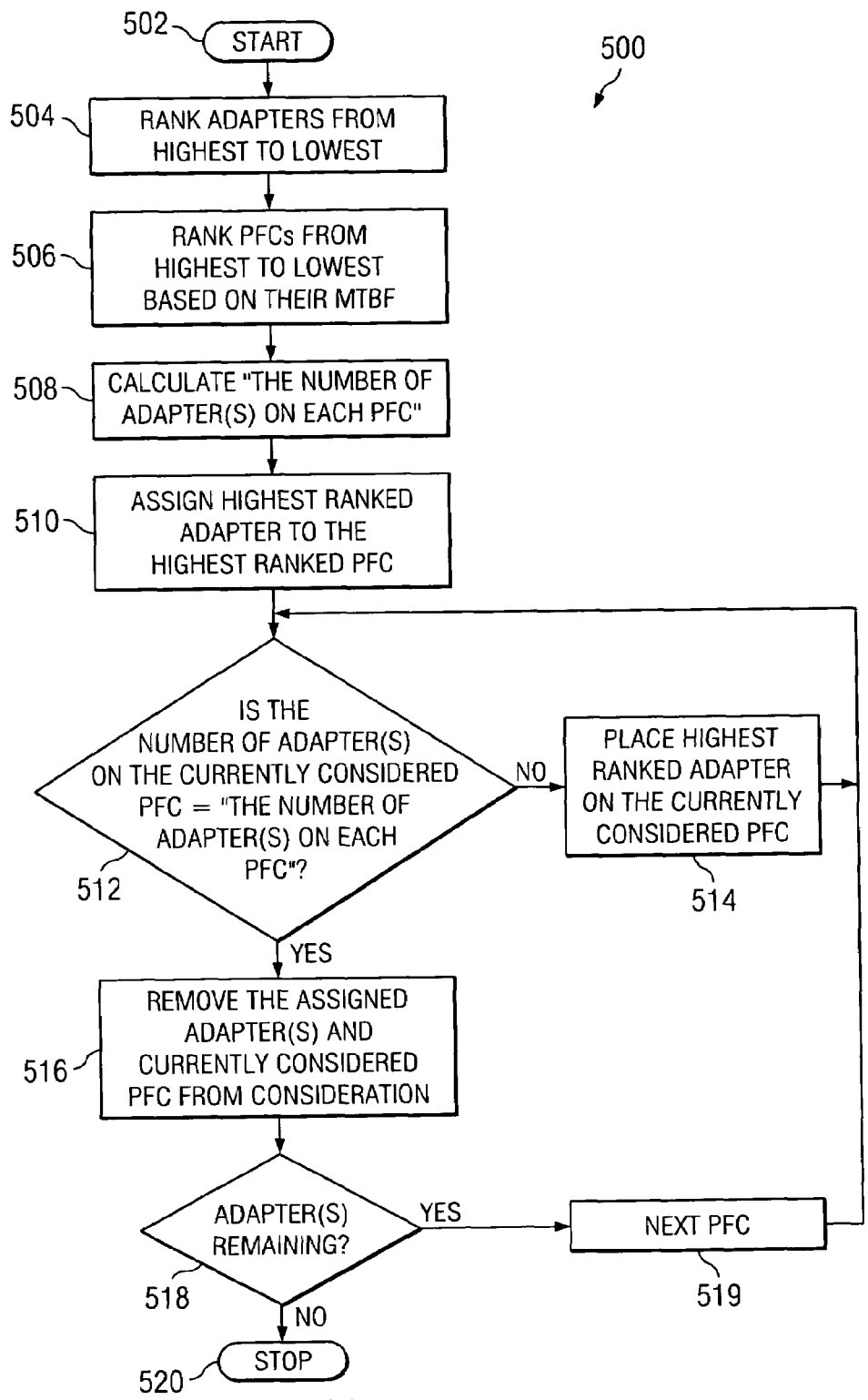
FIG. 10 is an illustration of the logic of Third Sequential Ranking Program (SRP3) of the present invention.

Turning to FIG. 10, the logic of SRP3 500 is illustrated. SRP3 500 is a program which ranks the adapters and places the adapters onto the PFCs based on the PFCs' mean time between failure (MTBF). SRP3 500 starts (502) when prompted by APP 200. SRP3 500 then ranks the adapters from highest to lowest based on the adapters' traffic intensity (504). SRP3 500 then ranks the PFCs from highest to lowest based on the PFCs' MTBF (506). In ranking the PFCs, the PFC with the highest MTBF is ranked highest and the PFC with the lowest MTBF is ranked lowest. For example, if PFC A has a MTBF of 10,000 hours, PFC B has a MTBF of 20,000 hours, and PFC C has a MTBF of 25,000 hours, the PFCs will be ranked (1)C, (2)B, and (3)A. SRP3 500 then calculates "the number of adapter(s) on each PFC" (508). "The number of adapter(s) on each PFC" is equal to the number of adapters divided by the number of PFCs $$\left(\frac{\text{\# adapters}}{\text{\# PFCs}}\right)$$

rounded up to the nearest whole number. Rounding up insures that the more prioritized adapters will be placed on the PFCs with the highest MTBF when there are an uneven amount of adapters on each PFC. SRP3 500 then assigns the highest ranked adapter to the first PFC (510). SRP3 500 then makes a determination whether the number of adapter(s) on the currently considered PFC is equal to "the number of adapter(s) on each PFC" calculated in step 508 (512). If the number of adapter(s) on the currently considered PFC is not equal to "the number of adapter(s) on each PFC" from step 508, then SRP3 500 places the lowest ranked adapter on the currently considered PFC (514) and returns to step 512. If at step 512 the number of adapter(s) on the currently considered PFC is equal to "the number of adapter(s) on each PFC," then SRP3 500 removes the assigned adapter(s) and currently considered PFC from consideration (516). SRP3 500 then determines if there are adapter(s) remaining (518). If there are adapter(s) remaining, then SRP3 500 proceeds to the next PFC (519) and returns to step 512. If there are not any adapter(s) remaining, then SRP3 500 ends (520).

Figure 11:
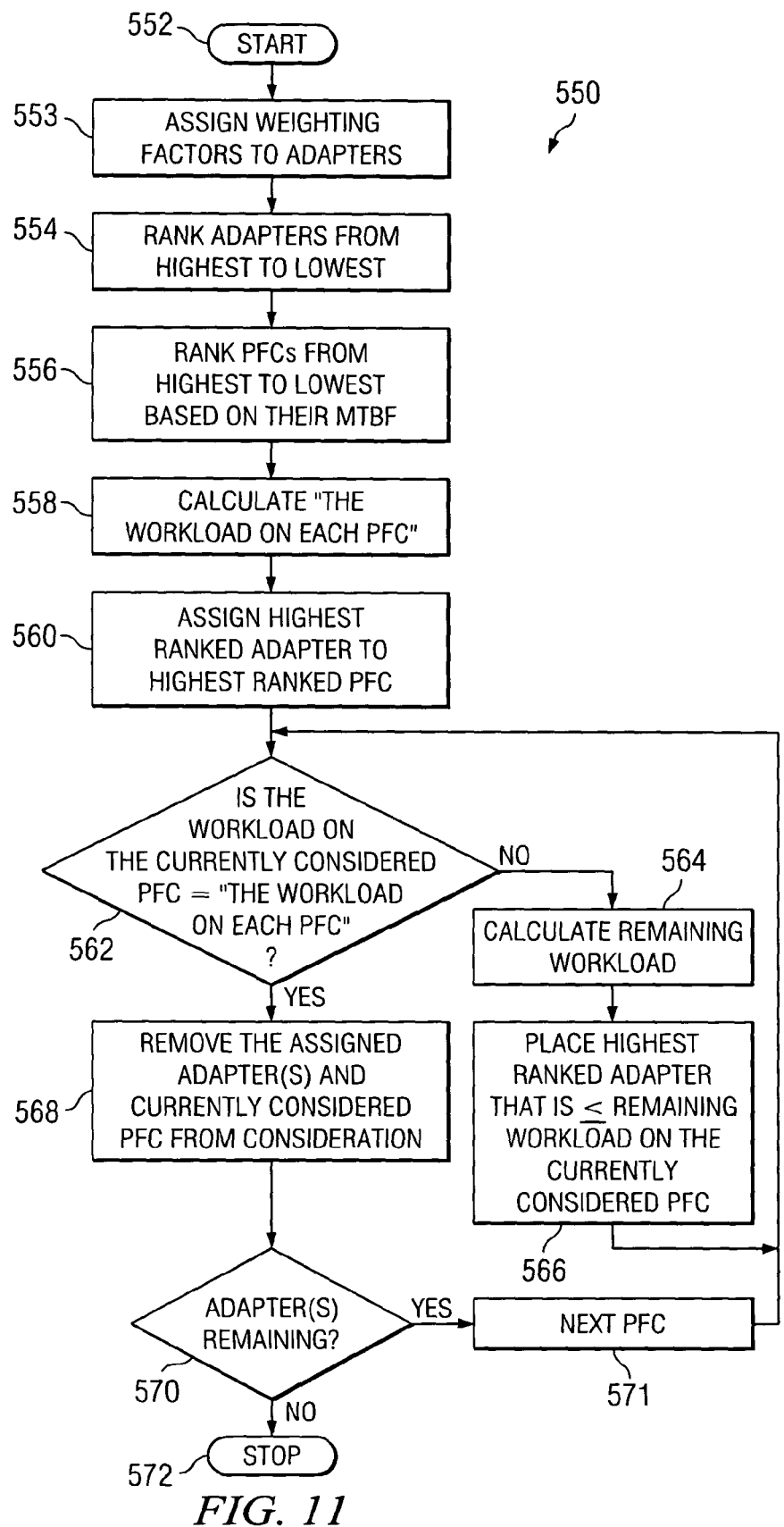
FIG. 11 is an illustration of the logic of Third Weighting Factor Program (WFP3) of the present invention.

Turning to FIG. 11, the logic of WFP3 550 is illustrated. WFP3 550 is a program which assigns weighting factors to the adapters and places the adapters onto the PFCs based on the adapters' weighting factor. WFP3 550 starts (552) when prompted by APP 200. WFP3 550 assigns weighting factors to the adapters based on one of the adapters' traffic intensity (553). WFP3 550 then ranks the adapters from highest to lowest based on the adapters' weighting factor (554). WFP3 550 then ranks the PFCs from highest to lowest based on the PFCs' MTBF (556). WFP3 550 then calculates "the workload on each PFC" (558). "The workload on each PFC" is equal to the sum of the weighting factors divided by the total number of PFCs $$\left( \frac{\sum \text{weighting factors}}{\# \, PFCs} \right)$$

rounded up to the nearest whole number. Rounding up insures that the more prioritized adapters will be placed on the PFCs with the higher MTBF. WFP3 550 then assigns the highest ranked adapter to the first PFC (560). WFP3 550 then makes a determination whether the workload on the currently considered PFC is equal to "the workload on each PFC" calculated in step 558 (562). If the workload on the currently considered PFC is not equal to "the workload on each PFC," then WFP3 550 calculates the remaining workload (564). The remaining workload is equal to "the workload on each PFC" calculated in step 558 minus the workload of the adapter(s) already assigned to the currently considered PFC. WFP3 550 then places the highest ranked adapter that is less than or equal to the remaining workload on the currently considered PFC (566) and returns to step 562. If at step 562 the workload on the currently considered PFC is equal to "the workload on each PFC," then WFP3 550 removes the assigned adapter(s) and currently considered PFC from consideration (568). WFP3 550 then determines if there are adapter(s) remaining (570). If there are adapter(s) remaining, then WFP3 550 proceeds to the next PFC (571) and returns to step 562. If there are not any adapter(s) remaining, then WFP3 550 ends (572).

Figure 12:
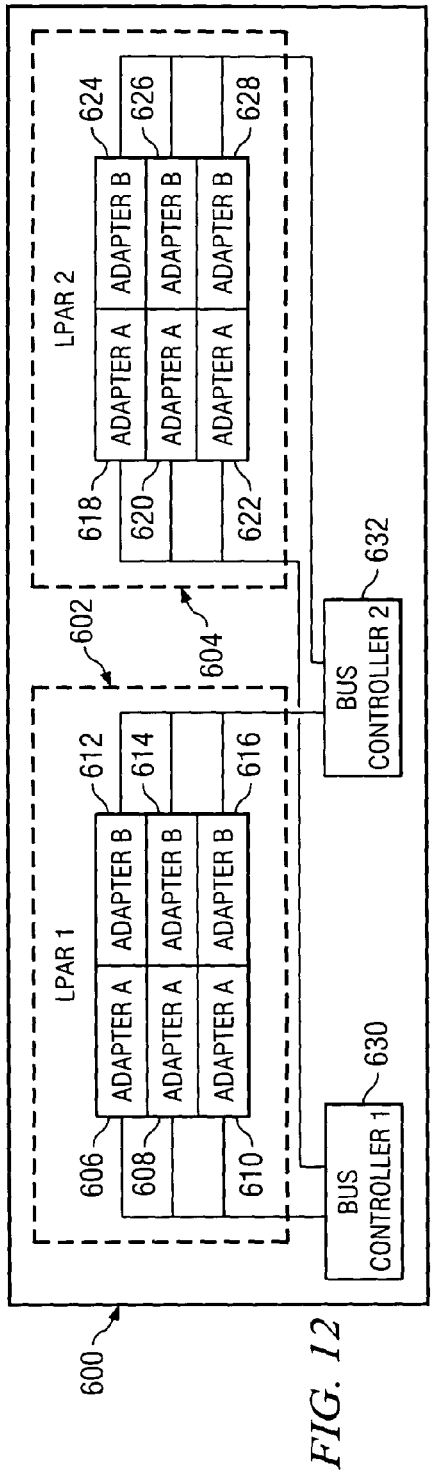
FIG. 12 is an illustration of a computer containing logical partitions with the adapters placed on the bus controllers using the manual configuration method.

Turning to FIG. 12, the result of the manual method of allocating adapters onto bus controllers is illustrated. Computer 600 contains two virtual systems: first virtual system 602 and second virtual system 604. First virtual system 602 contains two types of adapters, each occurring three times, for a total of six adapters: A type adapters 606, 608, and 610, and B type adapters 612, 614, and 616. Similarly, second virtual system 604 contains two types of adapters, each occurring three times, for a total of six adapters: A type adapters 618, 620, and 622, and B type adapters 624, 626, and 628. The adapters of first virtual system 602 and second virtual system 604 must be electrically connected to one of two bus controllers, first bus controller 630 or second bus controller 632, in order for first virtual system 602 and second virtual system 604 to operate properly. The traditional method of connecting the adapters to the bus controllers utilizes the artisans' knowledge of hardware architecture and implementation and typically yields the configuration depicted in FIG. 12. Specifically, the manual method typically produces a configuration in which the A type adapters 606, 608, 610, 618, 620, and 622 are electrically connected to first bus controller 630 and B type adapters 612, 614, 616, 624, 626, and 628 are electrically connected to second bus controller 632. The configuration in FIG. 12 is not preferable because a failure of first bus controller 630 will cause a complete loss of the A type adapters in both first virtual system 602 and second virtual system 604. Similarly, a failure of second bus controller 632 will cause a complete loss of the B type adapters in both first virtual system 602 and second virtual system 604.

Figure 13:
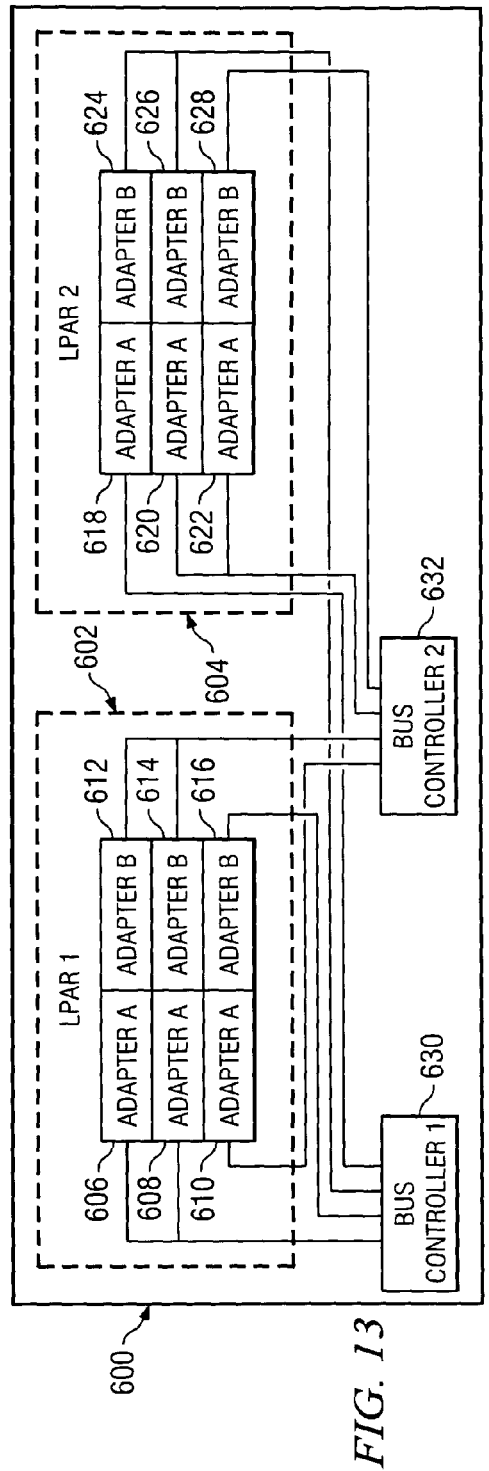
FIG. 13 is an illustration of a computer containing logical partitions with the adapters placed on the bus controllers using the present invention.

Turning to FIG. 13, a configuration produced by implementation of the present invention is depicted. Specifically, the illustration in FIG. 13 is from implementation of ATP1 300, SRP1 330, or WFP1 360. First virtual system 602 and second virtual system 604 in FIG. 13 contain the same adapters as depicted in FIG. 12. However, the electrical connection of A type adapters and B type adapters to first bus controller 630 and second bus controller 632 is altered to create redundancy in the connections between the adapters within the virtual systems and the bus controllers. As can be seen in FIG. 13, failure of first bus controller 630 will only cause the loss of use of A type adapters 606, 608, and 618 and B type adapters 616, 624, and 626. Failure of first bus controller 630 will not cause a complete loss in the use of A type and B type adapters in both virtual systems because first virtual system 602 still has A type adapter 610 and B type adapters 612 and 614 operating on second bus controller 632. Similarly, failure of second bus controller 632 will only cause the loss of use of A type adapters 610, 620, and 622 and B type adapters 612, 614, and 628. Failure of second bus controller 632 will not cause a complete loss in the use of A type and B type adapters in both virtual systems because second virtual system 604 still has A type adapter 618 and B type adapters 624 and 626 operating on first bus controller 630.

Figure 14:
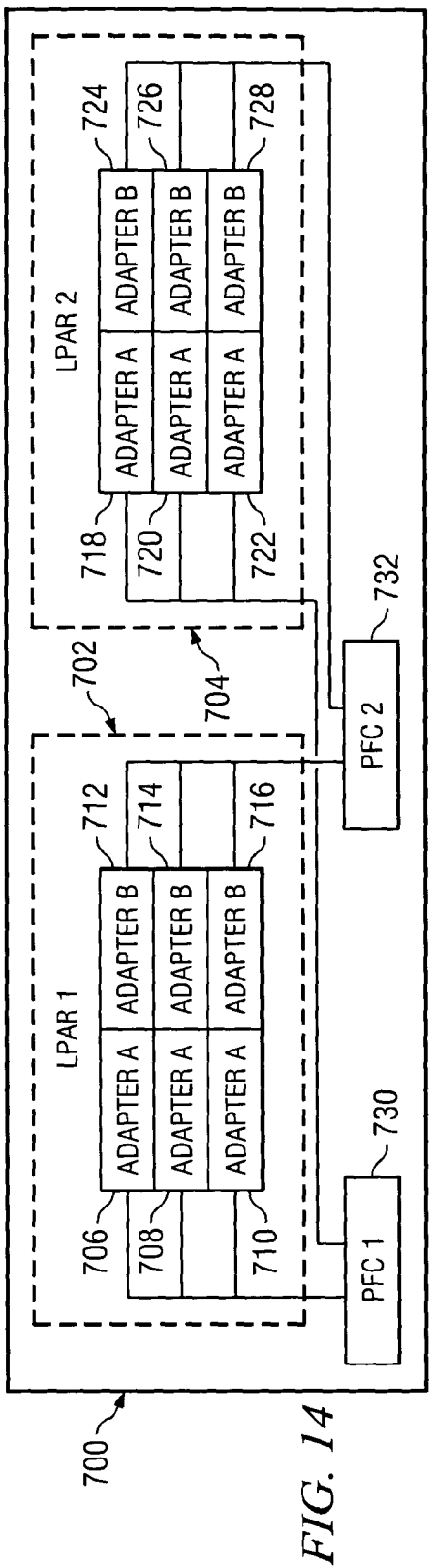
FIG. 14 is an illustration of a computer containing logical partitions with the adapters placed on the possibly failing components using the manual configuration method.

Turning to FIG. 14, the prior art method of allocating adapters onto PFCs is illustrated. Computer 700 contains two virtual systems: first virtual system 702 and second virtual system 704. First virtual system 702 contains two types of adapters, each occurring three times, for a total of six adapters: A type adapters 706, 708, and 710, and B type adapters 712, 714, and 716. Similarly, second virtual system 704 contains two types of adapters, each occurring three times, for a total of six adapters: A type adapters 718, 720, and 722, and B type adapters 724, 726, and 728. The adapters of first virtual system 702 and second virtual system 704 must be electrically connected to one of two PFCs, first PFC 730 or second PFC 732, in order for first virtual system 702 and second virtual system 704 to operate properly. The prior art method of connecting the adapters to the PFCs utilizes the artisans' knowledge of hardware architecture and implementation and typically yields the configuration depicted in FIG. 14. Specifically, the prior art method typically produces a configuration in which the A type adapters 706, 708, 710, 718, 720, and 722 are electrically connected to first PFC 730 and B type adapters 712, 714, 716, 724, 726, and 728 are electrically connected to second PFC 732. The configuration in FIG. 14 is not preferable because a failure of first PFC 730 will cause a complete loss of the A type adapters in both first virtual system 702 and second virtual system 704. Similarly, a failure of second PFC 732 will cause a complete loss of the B type adapters in both first virtual system 702 and second virtual system 704.

Figure 15:
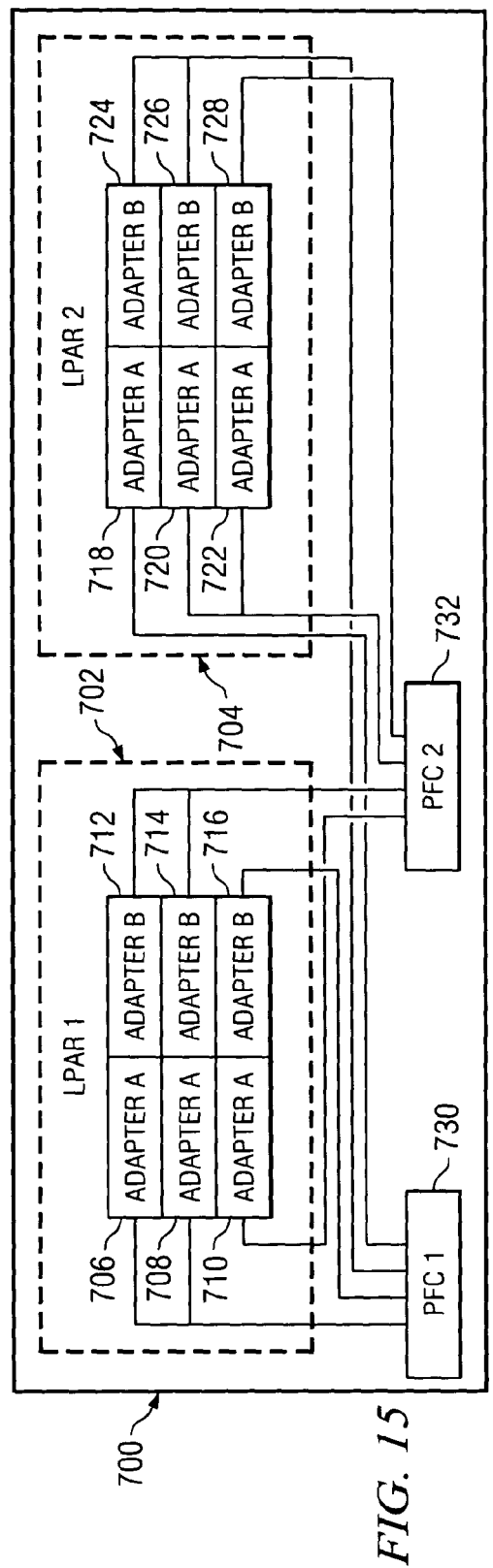
FIG. 15 is an illustration of a computer containing logical partitions with the adapters placed on the possibly failing components using the present invention.

Turning to FIG. 15, a configuration produced by implementation of the present invention is depicted. Specifically, the illustration in FIG. 14 is from implementation of ATP2 400, SRP2 430, WFP2 460, SRP3 500, or WFP3 550. First virtual system 702 and second virtual system 704 in FIG. 15 contain the same adapters as depicted in FIG. 14. However, the electrical connection of A type adapters and B type adapters to first PFC 730 and second PFC 732 is altered to create redundancy in the connections between the adapters within the virtual systems and the PFCs. As can be seen in FIG. 15, failure of first PFC 730 will only cause the loss of use of A type adapters 706, 708, and 718 and B type adapters 716, 724, and 726. Failure of first PFC 730 will not cause a complete loss in the use of A type and B type adapters in both virtual systems because first virtual system 702 still has A type adapter 710 and B type adapters 712 and 714 operating on second PFC 732. Similarly, failure of second PFC 732 will only cause the loss of use of A type adapters 710, 720, and 722 and B type adapters 712, 714, and 728. Failure of second PFC 732 will not cause a complete loss in the use of A type and B type adapters in both virtual systems because second virtual system 704 still has A type adapter 718 and B type adapters 724 and 726 operating on first PFC 730.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A method for allocating a plurality of adapters amongst a plurality of possibly failing components comprising:
   identifying a plurality of hot adapters;
   determining whether the number of hot adapters is greater than the number of possibly failing components; and
   responsive to a determination that the number of hot adapters is not greater than the number of possibly failing components, placing each hot adapter on a separate possibly failing component.

2. The method of claim 1 wherein the step of identifying the hot adapters further comprises:
   defining a traffic intensity threshold;
   comparing the adapters to the traffic intensity threshold; and
   responsive to the comparison for the adapters to the traffic intensity threshold, classifying the adapters as hot adapters or not hot adapters.

3. The method of claim 2 further comprising:
   responsive to a determination that the number of hot adapters is greater than the number of possibly failing components, increasing the traffic intensity threshold.

4. The method of claim 2 further comprising:
   distributing the not hot adapters among the remaining possibly failing components.

5. The method of claim 1 further comprising:
   determining whether a managed system has more than one adapter placed on one of the possibly failing components; and
   responsive to a determination that a managed system has more than one adapter placed on one of the possibly failing components, removing the possibly failing components containing more than one adapter from consideration.

6. The method of claim 1 further comprising:
   determining whether a managed system has more than one adapter placed on one of the possibly failing components; and
   responsive to a determination that a managed system does not have more than one adapter placed on one of the possibly failing components, placing the remaining adapters on the remaining possibly failing components.

7. The method of claim 1 wherein the possibly failing component is a bus controller.

8. A method for allocating a plurality of adapters amongst a plurality of possibly failing components comprising:
   ranking a plurality of adapters;
   ranking a plurality of possibly failing components;
   calculating a number of adapters on each possibly failing component;
   placing the highest ranked adapter onto the highest ranked possibly failing component;
   determining whether the number of adapters on the highest ranked possibly failing component is equal to the calculated number of adapters on each possibly failing component; and
   responsive to a determination that the number of adapters on the highest ranked possibly failing component is not equal to the calculated number of adapters on each possibly failing component, placing an adapter onto the highest ranked possibly failing component.

9. The method of claim 8 further comprising:
   responsive to a determination that the number of adapters on the highest ranked possibly failing component is equal to the calculated number of adapters on each possibly failing component, removing the highest ranked possibly failing component and assigned adapters from consideration.

10. The method of claim 8 wherein the adapter placed onto the highest ranked possibly failing component is the highest ranked adapter.

11. The method of claim 8 wherein the adapter placed onto the highest ranked possibly failing component is the lowest ranked adapter.

12. The method of claim 8 wherein the adapters are ranked based on the adapters' traffic intensity.

13. The method of claim 8 wherein the possibly failing components are ranked according to the number of adapters on the possibly failing components.

14. The method of claim 8 wherein the possibly failing components are ranked according to the possibly failing components' mean time between failure.

15. The method of claim 8 wherein the possibly failing component is a bus controller.

16. A method for allocating a plurality of adapters amongst a plurality of possibly failing components comprising:
assigning weighting factors to a plurality of adapters;
ranking the plurality of adapters;
ranking a plurality of possibly failing components;
calculating a workload on each possibly failing component;
placing the highest ranked adapter onto the highest ranked possibly failing component;
determining whether the workload on the highest ranked possibly failing component is equal to the calculated workload on each possibly failing component; and
responsive to a determination that the number of adapters on the highest ranked possibly failing component is not equal to the calculated number of adapters on each possibly failing component, placing an adapter onto the highest ranked possibly failing component.

17. The method of claim 16 further comprising: wherein the placing an adapter on the highest ranked possibly failing component step further comprises:
calculating a remaining workload; and
placing the highest ranked adapter that is less than or equal to the remaining workload onto the possibly failing component.

18. The method of claim 16 further comprising:
responsive to a determination that the number of adapters on the highest ranked possibly failing component is equal to the calculated number of adapters on each possibly failing component, removing the highest ranked possibly failing component and assigned adapters from consideration.

19. The method of claim 16 wherein the adapters are ranked based on the adapters' traffic intensity.

20. The method of claim 16 wherein the possibly failing components are ranked according to the number of adapters on the possibly failing components.

21. The method of claim 16 wherein the possibly failing components are ranked according to the possibly failing components' mean time between failure.

22. The method of claim 16 wherein the possibly failing component is a bus controller.

23. A program product operable on a computer, the program product comprising:
a computer-usable medium;
wherein the computer usable medium comprises instructions comprising:
instructions for identifying a plurality of hot adapters;
instructions for determining whether the number of hot adapters is greater than the number of possibly failing components; and
responsive to a determination that the number of hot adapters is not greater than the number of possibly failing components, instructions for placing each hot adapter on a separate possibly failing component.

24. The program product of claim 23 wherein the step of identifying the hot adapters further comprises:
instructions for defining a traffic intensity threshold;
instructions for comparing the adapters to the traffic intensity threshold; and
responsive to the comparison for the adapters to the traffic intensity threshold, instructions for classifying the adapters as hot adapters or not hot adapters.

25. The program product of claim 24 further comprising:
responsive to a determination that the number of hot adapters is greater than the number of possibly failing components, instructions for increasing the traffic intensity threshold.

26. The program product of claim 24 further comprising:
instructions for distributing the not hot adapters among the remaining possibly failing components.

27. The program product of claim 23 further comprising:
instructions for determining whether a managed system has more than one adapter placed on one of the possibly failing components; and
responsive to a determination that a managed system has more than one adapter placed on one of the possibly failing components, instructions for removing the possibly failing components containing more than one adapter from consideration.

28. The program product of claim 23 further comprising:
instructions for determining whether a managed system has more than one adapter placed on one of the possibly failing components; and
responsive to a determination that a managed system does not have more than one adapter placed on one of the possibly failing components, instructions for placing the remaining adapters on the remaining possibly failing components.

29. The program product of claim 23 wherein the possibly failing component is a bus controller.

30. A program product operable on a computer, the program product comprising:
a computer-usable medium;
wherein the computer usable medium comprises instructions comprising:
instructions for ranking a plurality of adapters;
instructions for ranking a plurality of possibly failing components;
instructions for calculating a number of adapters on each possibly failing component;
instructions for placing the highest ranked adapter onto the highest ranked possibly failing component;
instructions for determining whether the number of adapters on the highest ranked possibly failing component is equal to the calculated number of adapters on each possibly failing component; and
responsive to a determination that the number of adapters on the highest ranked possibly failing component is not equal to the calculated number of adapters on each possibly failing component, instructions for placing an adapter onto the highest ranked possibly failing component.

31. The program product of claim 30 further comprising:
responsive to a determination that the number of adapters on the highest ranked possibly failing component is equal to the calculated number of adapters on each possibly failing component, instructions for removing the highest ranked possibly failing component and assigned adapters from consideration.

32. The program product of claim 30 wherein the adapter placed onto the highest ranked possibly failing component is the highest ranked adapter.

33. The program product of claim 30 wherein the adapter placed onto the highest ranked possibly failing component is the lowest ranked adapter.

34. The program product of claim 30 wherein the adapters are ranked based on the adapters' traffic intensity.

35. The program product of claim 30 wherein the possibly failing components are ranked according to the number of adapters on the possibly failing components.

36. The program product of claim 30 wherein the possibly failing components are ranked according to the possibly failing components' mean time between failure.

37. The program product of claim 30 wherein the possibly failing component is a bus controller.

38. A program product operable on a computer, the program product comprising:
- a computer-usable medium;
- wherein the computer usable medium comprises instructions comprising:
    - instructions for assigning weighting factors to a plurality of adapters;
    - instructions for ranking the plurality of adapters;
    - instructions for ranking a plurality of possibly failing components;
    - instructions for calculating a workload on each possibly failing component;
    - instructions for placing the highest ranked adapter onto the highest ranked possibly failing component;
    - instructions for determining whether the workload on the highest ranked possibly failing component is equal to the calculated workload on each possibly failing component; and
    - responsive to a determination that the number of adapters on the highest ranked possibly failing component is not equal to the calculated number of adapters on each possibly failing component, instructions for placing an adapter onto the highest ranked possibly failing component.

39. The program product of claim 38 further comprising: wherein the instructions for placing an adapter on the highest ranked possibly failing component step further comprises:
- instructions for calculating a remaining workload; and
- instructions for placing the highest ranked adapter that is less than or equal to the remaining workload onto the possibly failing component.

40. The program product of claim 38 further comprising:
- responsive to a determination that the number of adapters on the highest ranked possibly failing component is equal to the calculated number of adapters on each possibly failing component, instructions for removing the highest ranked possibly failing component and assigned adapters from consideration.

41. The program product of claim 38 wherein the adapters are ranked based on the adapters' traffic intensity.

42. The program product of claim 38 wherein the possibly failing components are ranked according to the number of adapters on the possibly failing components.

43. The program product of claim 38 wherein the possibly failing components are ranked according to the possibly failing components' mean time between failure.

44. The program product of claim 38 wherein the possibly failing component is a bus controller.

* * * * *